US012411945B1

(12) United States Patent
Colon et al.

(10) Patent No.: US 12,411,945 B1
(45) Date of Patent: Sep. 9, 2025

(54) LARGE LANGUAGE MODEL TO DETECT AND EMULATE MALICIOUS ACTIVITY

(71) Applicant: Amazon Technologies, Inc., Seattle, WA (US)

(72) Inventors: Brendan Cruz Colon, Seattle, WA (US); Joshua Scott Hansen, Sahuarita, AZ (US); Christopher Miller, Seattle, WA (US); Matthew Michael Sommer, Issaquah, WA (US); Alexander Noble Adkins, Catlettsburg, KY (US); Daniel Azuara, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 279 days.

(21) Appl. No.: 18/083,357

(22) Filed: Dec. 16, 2022

(51) Int. Cl.
*G06F 21/62* (2013.01)
*G06F 21/55* (2013.01)

(52) U.S. Cl.
CPC ........ *G06F 21/554* (2013.01); *G06F 21/6218* (2013.01); *G06F 2221/033* (2013.01)

(58) Field of Classification Search
CPC ............... G06F 21/554; G06F 21/6218; G06F 2221/033
USPC ...................................................... 726/22–25
See application file for complete search history.

(56) References Cited

U.S. PATENT DOCUMENTS

| | | | |
|---|---|---|---|
| 2019/0102554 A1* | 4/2019 | Luo .................. | G06F 21/554 |
| 2023/0370393 A1* | 11/2023 | Da Jornada ......... | G06F 18/2178 |
| 2023/0403357 A1* | 12/2023 | Ezell .................. | H04L 51/066 |
| 2024/0045990 A1* | 2/2024 | Boyer ................. | G06F 21/6245 |
| 2024/0143289 A1* | 5/2024 | Pandita ............... | G06F 8/33 |

OTHER PUBLICATIONS

Steven Johnson; "A.I. Is Mastering Language. Should We Trust What It Says?"; https://www.nytimes.com/2022/04/15/magazine/ai-language.html; The NewYork Times Magazine; Apr. 2022; accessed Jan. 13, 2023; 12 pages.

\* cited by examiner

*Primary Examiner* — Bharat Barot
(74) *Attorney, Agent, or Firm* — BakerHostetler (57) ABSTRACT

A method includes generating a set of training data, wherein a first training instance of the set of training data comprises a first plurality of messages between a first customer service agent and a first purported customer and a first label indicating whether one or more messages of the first plurality of messages are associated with malicious behavior; training a large language model (LLM) using the set of training data to generate messages; generating, by the LLM representing a second purported customer, a message associated with malicious behavior; receiving a response message from a second customer service agent based on the message associated with malicious behavior; and in response to the response message being an authorization, generating a feedback for the second customer service agent based on a number of responses before the response was an action.

20 Claims, 6 Drawing Sheets

LARGE LANGUAGE MODEL TO DETECT AND EMULATE MALICIOUS ACTIVITY

BACKGROUND

Online fraud attempts continue to grow year-over-year, putting pressure on online entities and network administrators to innovate in order to protect customers and prevent service disruption. The field of online fraud detection and cyberattack prevention can be categorized as an adversarial environment, where those with intentions to commit fraud and/or malicious attacks are pitted against those endeavoring to prevent and deter such activity. This "arms race," as it is often referred to, involves continuous adaptation as opponents' tactics evolve over time.

BRIEF SUMMARY

The present disclosure includes a method including generating a set of training data, wherein a first training instance of the set of training data comprises a first plurality of messages between a first customer service agent and a first purported customer and a first label indicating whether one or more messages of the first plurality of messages are associated with malicious behavior; training a large language model (LLM) using the set of training data to generate messages; generating, by the LLM representing a second purported customer, a message associated with malicious behavior; receiving a response message from a second customer service agent based on the message associated with malicious behavior; and in response to the response message being an authorization, generating a feedback for the second customer service agent based on a number of responses before the response was an action.

The present disclosure also includes a method including generating a set of training data, wherein a first training instance of the set of training data comprises a first plurality of messages exchanged between a first customer service agent and a first purported customer and a first label indicating whether one or more messages of the first plurality of messages are associated with malicious behavior; training a large language model (LLM) using the set of training data to generate predictions; receiving, by the LLM, a transcript, wherein the transcript comprises a second plurality of messages exchanged between a second customer service agent and a second purported customer; and generating, by the LLM, a confidence score indicating a prediction as to whether the transcript comprises one or more messages indicative of malicious behavior.

The present disclosure further includes a system including a controller. The controller is configured to perform operations including generating a set of training data, wherein a first training instance of the set of training data comprises a first plurality of messages exchanged between a first customer service agent and a first purported customer and a first label indicating whether one or more messages of the first plurality of messages are associated with malicious behavior; training a large language model (LLM) using the set of training data to generate predictions; receiving, by the LLM, a transcript, wherein the transcript comprises a second plurality of messages exchanged between a second customer service agent and a second purported customer; and generating, by the LLM, a confidence score indicating a prediction as to whether the transcript comprises one or more messages indicative of malicious behavior.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more other embodiments of the subject technology. In one or more embodiments of the subject technology, structures and components are shown in block diagram form in order to avoid obscuring the concepts of the subject technology.

Perpetrators of transactional fraud and other cyber attacks continually attempt to modify their behavior and/or the characteristics of their attacks and/or fraudulent transactions in order to avoid detection by automated filters and/or machine learning models used to distinguish between potentially fraudulent transactions and non-fraudulent transactions. As a result, technologies are continuously developed by fraud prevention and cyber security teams to attempt to detect and prevent such attacks in an ever-evolving climate. Accordingly, the actions of perpetrators of fraud and other cyber attacks and cyber security teams are adversarial in nature, as a change in attack detection techniques results in evolving attack methodologies and vice versa.

In various examples, malicious actors may perform social engineering to gain access to goods and services to which they are not entitled. Social engineering represents one of the largest threats to customer security in enterprise systems. Social engineering may occur when a malicious actor contacts customer service and pressures the customer service agent to unknowingly act against the best interests of actual customers. Identified social engineering tactics can expose customer data and account access to threat actors.

In one approach for mitigating social engineering attacks, hard-coded phrases may be manually searched for evidence of social engineering in customer service transcripts. The resulting transcripts may then be validated by humans to be malicious or non-malicious. This process, alongside transcripts from previous large-scale social engineering incidents, may result in a corpus of labeled social engineering techniques. Most natural language processing (NLP) techniques could train on this corpus and search for similar patterns in a given day's set of transcripts. On the one hand, simple models such as the Naive Bayes classifier will generally perform well until the malicious actor's sentence structure and/or tactic varies. On the other hand, more complex models like recurrent neural networks (RNNs) could perform well, but the corpus of social engineering transcripts is nowhere near large enough to train. This is because RNNs not only have to learn social engineering techniques but also how language is structured.

Machine learning techniques, such as those described herein, are often used to form predictions, solve problems, recognize objects in image data for classification, etc. For example, herein machine learning techniques may be used to predict whether messages include malicious behavior and/or generate messages including malicious behavior. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learning models, such as neural networks, parameters control activations in neurons (or nodes) within layers of the machine learning models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as backpropagation.

LLMs are large models trained on broad segments of the Internet to understand a language. LLMs may be pre-trained as domain-neutral and can be fine-tuned to be domain-specific (e.g., social engineering). LLMs have two advantages: (1) they can be fine-tuned with much less data than an RNN (e.g., hundreds rather than hundreds of thousands of examples), and (2) they are capable of creating higher-level connections with words. Accordingly, the subject technology utilizes LLMs that are fine-tuned to classify different types of social engineering and/or emulate malicious actor behavior in the form of a chatbot.

Figure 1:
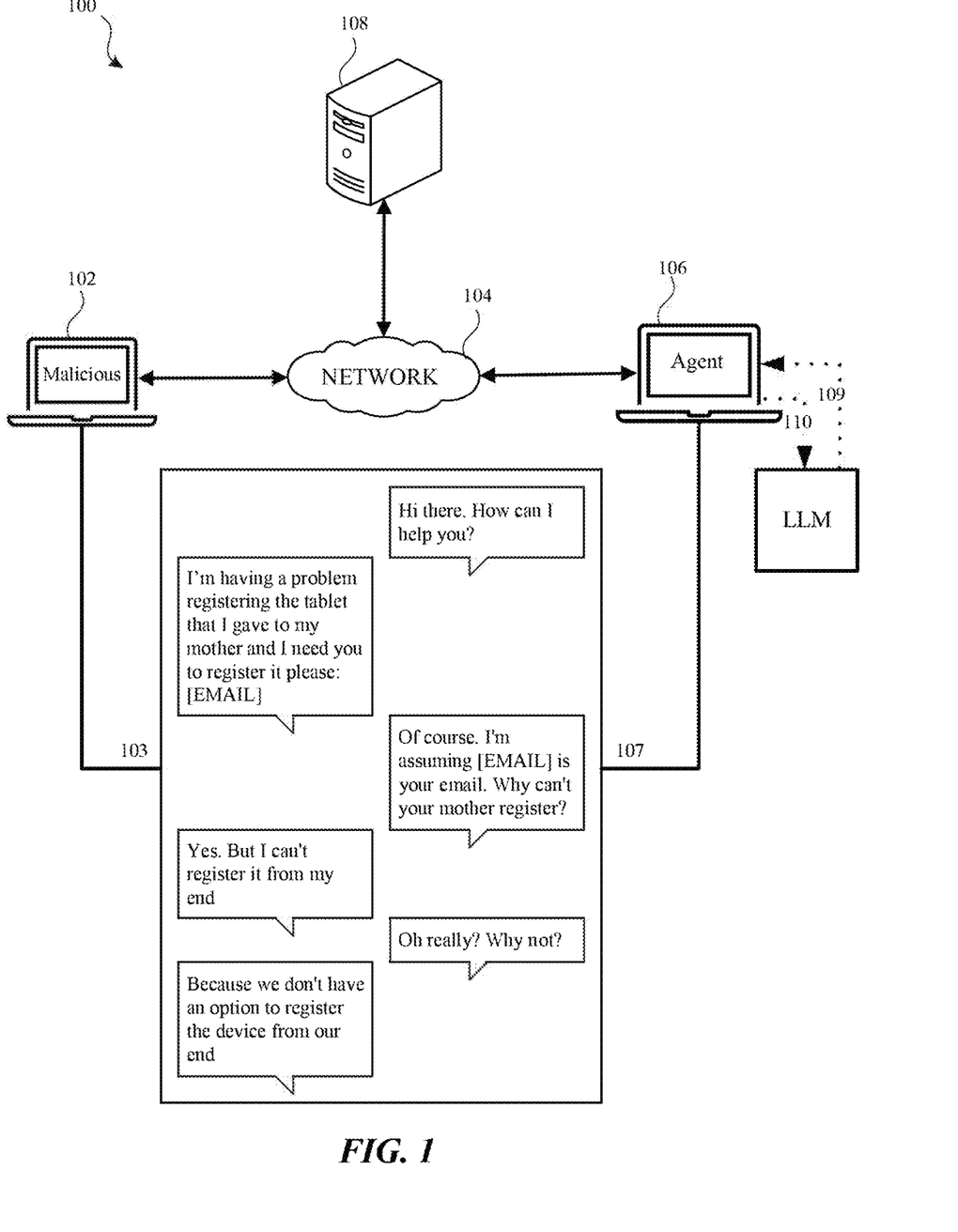
FIG. 1 illustrates a first example network configuration, in accordance with one or more embodiments of the subject technology.

FIG. 1 illustrates a network environment 100, in accordance with one or more embodiments of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include computing devices 102, 106 and one or more servers (e.g., a server 108). A network 104 may communicatively couple (directly or indirectly) the computing devices 102, 106 and the server 108. In one or more implementations, the network 104 may be an interconnected network of devices that may include, or may be communicatively coupled to, the Internet. For explanatory purposes, the network environment 100 is illustrated in FIG. 1 as including the computing devices 102, 106 and the server 108; however, the network environment 100 may include any number of electronic devices and/or any number of servers communicatively coupled to each other directly or via the network 104.

The computing devices 102, 106 may be, for example, desktop computers, portable computing devices such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, near field communication (NFC) radios, and/or other wireless radios. In FIG. 1, by way of example, the computing devices 102, 106 are depicted as a laptop computer. The computing devices 102, 106 may be, and/or may include all or part of, the electronic system discussed below with respect to FIG. 5. It is understood that although only two computing devices are shown, any amount of computing devices may be utilized.

The server 108 may be a device similar to the computing device 102, 106. The server 108 may also include an LLM and one or more applications interfacing with the LLM. In FIG. 1, by way of example, the server 108 is depicted as a server computer. The server 108 may be, and/or may include all or part of, the electronic system discussed below with respect to FIG. 5. The server 108 may receive information from the computing devices 102, 106 for exchanging messages between the computing devices 102, 106.

In various examples, each of the computing devices 102, 106 used to implement an LLM may comprise one or more processors. The computing devices 102, 106 used to implement an LLM may each be configured in communication with at least one non-transitory computer-readable memory. In at least some examples, the computing devices 102, 106 used to implement an LLM may communicate with memory over the network 104. The memory may store computer-readable instructions that, when executed by at least one processor of the computing devices 102, 106 implementing an LLM, may be effective to program the one or more processors to perform the various fraud detection techniques and/or execute the various machine learning models described herein.

In various examples, network 104 is a wide area network, such as the Internet, while in other embodiments, the network 104 is a local area network (LAN) over which requests may be received. In some further embodiments, network 104 is a combination of the Internet and a LAN.

Any of the computing devices 102, 106, and/or the server 108 may include one or more neural networks. A neural network may be a deep learning network. Various implementations of the neural network are possible. For example, the neural network may be a large language model (LLM), a transformer-based model (or other attention-based models), a multi-layer perceptron or other feed-forward networks, etc. As described in further detail below, the neural network may be trained using training data samples comprising messages between a purported customer and a customer service agent labeled indicating whether the particular training sample represents a malicious or non-malicious behavior. The neural network may output a confidence score (e.g., between 0 and 1) from an output layer of the neural network, indicating a likelihood of the input request being malicious (or not malicious, depending on the implementation).

In various examples, an LLM may be trained to generate a confidence score indicating a prediction as to whether messages from a purported customer are indicative of malicious behavior. The LLM may be trained using various combinations of input data, such as a plurality of transcripts, each including a plurality of messages exchanged between a customer service agent and a purported customer. In one or more embodiments, the training may include fine-tuning, such as adaptive fine-tuning, behavioral fine-tuning, parameter-efficient fine-tuning, text-to-text fine-tuning, and the like. Each of the plurality of transcripts may be labeled as including one or more messages associated with malicious behavior. Messages associated with malicious behavior may include messages that are automatically and/or manually identified as including words and/or phrases that attempt and/or result in account takeover, gift card deceit (e.g., fraud), and/or unknown package deceit (e.g., fraud), concession abuse, among other forms of attacks that grant a purported customer improper access to funds, goods, services, and the like. The trained LLM may receive as input a transcript including a plurality of messages and generate as output a confidence level that the transcript includes malicious behavior. The confidence level may be refined as more messages are exchanged. For example, the customer service agent may send more messages to the purported customer to receive additional messages from the purported customer. The additional information may be input to the trained LLM to generate another confidence level, which may be more accurate than the original confidence level. The confidence level may be compared to a threshold confidence level to determine a response action to mitigate the impact of the potentially malicious behavior.

For example, a computing device 102 corresponding to a purported customer may initiate a conversation with a computing device 106 associated with a customer service agent. The conversation includes messages 103 from the purported customer and messages 107 from the customer service agent; the combination of the messages 103, 107 forms a transcript. The messages may be sent directly between the computing devices 102, 106 and/or via the server 108. During and/or after the conversation, the transcript of the conversation (including messages 103, 107) may be input 110 into a trained LLM stored in a computing device 106 of the customer service agent and/or the server 108. The trained LLM may output a confidence level 109 that the transcript includes messages indicative of malicious behavior. The messages 103 from the purported customer include messages attempting to gain access to an account, including registering devices to an account to access the account. Accordingly, the output of the trained LLM may be a high confidence level of the transcript including malicious activity (or a low confidence level of non-malicious activity, depending on the implementation).

In various examples, the confidence scores may be compared to a threshold confidence score. The threshold confidence score may be a static threshold. For example, each server 108 utilizing the LLM and servicing a set of customer service agents may set its own threshold according to a recent amount of malicious behavior. In some other examples, the threshold confidence score may be dynamically determined (e.g., using statistical outlier detection methodologies). For example, confidence scores that are greater than two standard deviations from a mean confidence score may be determined to be outliers and malicious (or non-malicious).

In some examples, if messages 103 from the purported user is determined to be malicious (e.g., based on the confidence score and the threshold confidence score), data indicating that the messages 103 has been determined to be likely malicious may be sent back (e.g., via the API) to the customer service agent (e.g., computing device 106). The data may include a warning message to the customer service agent. The data may also or instead include a recommended response action, such as ending the conversation, suspending the purported user, suspending an IP address of the purported user, and any other action relating to the purported user. The customer service agent may then take a response action (e.g., the recommended response action) to mitigate the malicious behavior.

In various examples, computing devices of other customer service agents may correspond to different entities availing themselves of the LLM (e.g., stored in the server 108). In such examples, updating the LLM over time based on recently-received data (e.g., transcripts including messages from purported customers) that are labeled (e.g., in accordance with the labeling techniques described herein) inures the benefit of all the different entities using the LLM, as the LLM becomes better able to detect different social engineering tactics, regardless of whether any particular entity has been attacked in the past.

Figure 2:
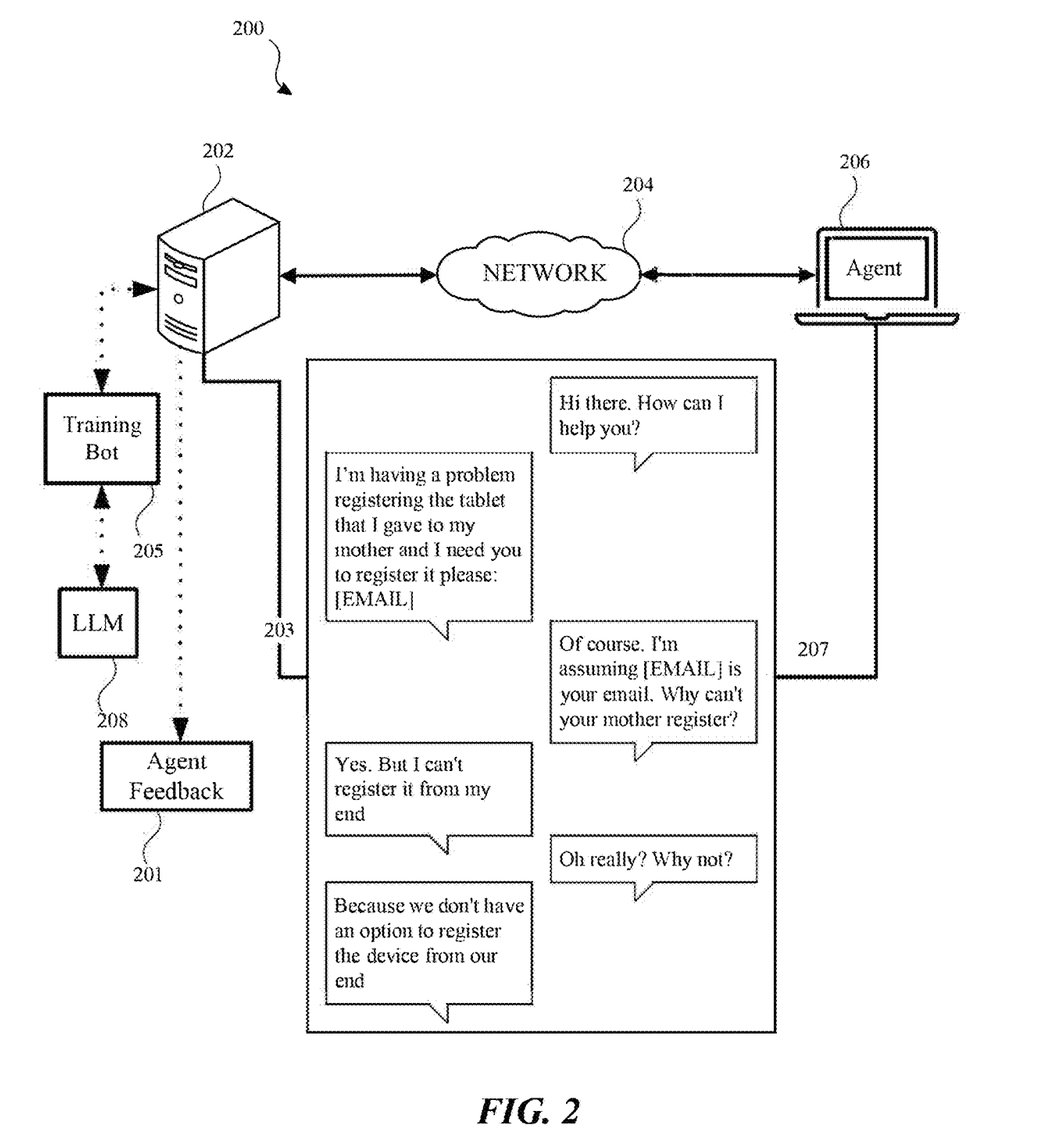
FIG. 2 illustrates a second example network configuration, in accordance with one or more embodiments of the subject technology.

FIG. 2 illustrates a second network environment 200, in accordance with one or more embodiments of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 200 may include computing device 206 and one or more servers (e.g., a server 202). A network 204 may communicatively couple (directly or indirectly) the computing device 206 and the server 202. In one or more implementations, the network 204 may be an interconnected network of devices that may include, or may be communicatively coupled to, the Internet. For explanatory purposes, the network environment 200 is illustrated in FIG. 2 as including the computing device 206 and the server 202; however, the network environment 200 may include any number of electronic devices and/or any number of servers communicatively coupled to each other directly or via the network 204.

The computing device 206 may be, for example, a desktop computer, portable computing device such as a laptop computer, smartphone, peripheral device (e.g., a digital camera, headphones), tablet device, wearable device such as a watch, a band, and the like, or any other appropriate device that includes, for example, one or more wireless interfaces, such as WLAN radios, cellular radios, Bluetooth radios, NFC radios, and/or other wireless radios. In FIG. 2, by way of example, the computing device 206 is depicted as a laptop computer. The computing device 206 may be, and/or may include all or part of, the electronic system discussed below with respect to FIG. 5. It is understood that although only two computing devices are shown, any amount of computing devices may be utilized.

The server 202 may be a device similar to the computing device 206. The server 202 may also include an LLM and one or more applications interfacing with the LLM. In FIG. 2, by way of example, the server 202 is depicted as a server computer. The server 202 may be, and/or may include all or part of, the electronic system discussed below with respect to FIG. 5. The server 202 may receive information from the computing device 206 for exchanging messages between the computing device 206.

In various examples, the computing device 206 used to implement an LLM may comprise one or more processors. The computing device 206 used to implement an LLM may each be configured in communication with at least one non-transitory computer-readable memory. In at least some examples, the computing device 206 used to implement an LLM may communicate with memory over the network 204. The memory may store computer-readable instructions that, when executed by at least one processor of the computing device 206 implementing an LLM, may be effective to program the one or more processors to perform the various fraud detection techniques and/or execute the various machine learning models described herein.

In various examples, network 204 is a wide area network, such as the Internet, while in other embodiments, the network 204 is a LAN over which requests may be received. In some further embodiments, network 204 is a combination of the Internet and a LAN.

The computing device 206 and/or the server 202 may include one or more neural networks. A neural network may be a deep learning network. Various implementations of the neural network are possible. For example, the neural network may be an LLM, a transformer-based model (or other attention-based model), a multi-layer perceptron or other feed-forward networks, etc. As described in further detail below, the neural network may be trained using training data samples comprising messages between a purported customer and a customer service agent labeled indicating whether the particular training sample represents a malicious or non-malicious behavior. The neural network may generate and output a string of text from an output layer of the neural network including malicious behavior (or non-malicious, depending on the implementation).

In various examples, a training bot (e.g., a chatbot) may be configured with an LLM to spoof a customer interaction with a customer service agent. The training bot may use the trained LLM to output a string of text indicative of malicious behavior to send (e.g., for training purposes) to a customer service agent (e.g., the computing device 206) as a purported customer. The LLM may be trained using various combinations of input data, such as a plurality of transcripts each including a plurality of messages exchanged between a customer service agent and a purported customer. Each of the plurality of transcripts may be labeled as including one or more messages associated with malicious behavior. Messages associated with malicious behavior may include messages that are automatically and/or manually identified as including words and/or phrases that attempt and/or result in account takeover, gift card deceit (e.g., fraud), and/or unknown package deceit (e.g., fraud), among other forms of attacks that grant a purported customer improper access to goods and services. The trained LLM may receive as input a message (e.g., from a customer service agent) and generate as output a string of text as a response. The output string of text may be a message including malicious behavior. In one or more implementations, the malicious behavior may be manifested across multiple output strings of text as more messages are exchanged. For example, the customer service agent may have a conversation with a purported customer and, as the conversation progress, the message output from the LLM may show signs of malicious behavior. One or more response messages (e.g., messages responding to the chatbot) from a customer service agent (e.g., via computing device 206) may be analyzed to determine whether the customer service agent is handling malicious behavior appropriately and generating feedback to the customer service agent during or after the conversation for purposes of training customer service agents.

For example, the server 202 may operate a training bot 205 configured to employ a trained LLM 208 representing a purported customer and may initiate a conversation (e.g., send a first message and/or click a user interface element to be matched with a customer service agent who sends a first message) with a computing device 206 associated with a customer service agent. The conversation includes messages 203 from the training bot 205 and messages 207 from the customer service agent, the combination of the messages 203, 207 forms a transcript. During the conversation, a message (e.g., a message from messages 207) from the customer service agent may be sent to the training bot 205 for generating a response. The training bot 205 may output a string of text to send to the customer service agent a response message. The message may include texts that are indicative of malicious behavior. In one or more implementations, the behavior may span the course of multiple messages. The behavior from the training bot 205 includes one or more messages attempting to gain access to an account, including registering devices to an account to access the account. The customer service agent may recognize the malicious activity and take appropriate action (e.g., suspend the IP address associated with the purported customer). In scenarios where the customer service agent does not recognize the behavior as indicative of malicious activity (e.g., authorizes the account access), the training bot 205 may output a feedback indicator 201 for the customer service agent (e.g., automatically and/or manually). The feedback may include one or more messages of the transcript representing malicious behavior and/or one or more appropriate actions to take in response to the malicious behavior. In one or more implementations, the feedback may be a grade scoring the customer service agent based on the customer service agent's responses (e.g., number of response messages and/or actions taken or forgone in response to malicious behavior). Alternatively, the feedback and scoring could be determined by a separate computing device other than server 202 or computing device 206. In such a system, the transcript, along with actions taken by the customer service agent, could be recorded and analyzed by a system designed to determine and score expected actions by the customer service agent.

In some examples, if messages 203 from the chatbot are not identified by the customer service agent as indicative of malicious behavior, data indicating that the messages 203 include malicious behavior may be sent back (e.g., via the API) to the customer service agent (e.g., computing device 206). The data may include feedback to the customer service agent, which may include an indication that the message from the chatbot is associated with malicious behavior. The data may also or instead include a recommended response action, such as ending the conversation, suspending the purported user, suspending an IP address of the purported user, and any other action relating to the purported user. The customer service agent may then take a response action (e.g., the recommended response action) to mitigate the malicious behavior.

In various examples, computing devices of other customer service agents may correspond to different entities availing themselves of the LLM (e.g., stored in the server 202). In such examples, updating the LLM over time based on recently-received data (e.g., transcripts including messages between purported customers and customer service agents) that are labeled (e.g., in accordance with the labeling techniques described herein) inures the benefit of all the different entities using the LLM, as the LLM becomes better able to generating messages utilizing different social engineering tactics, regardless of whether any particular entity has been attacked in the past.

Figure 3:
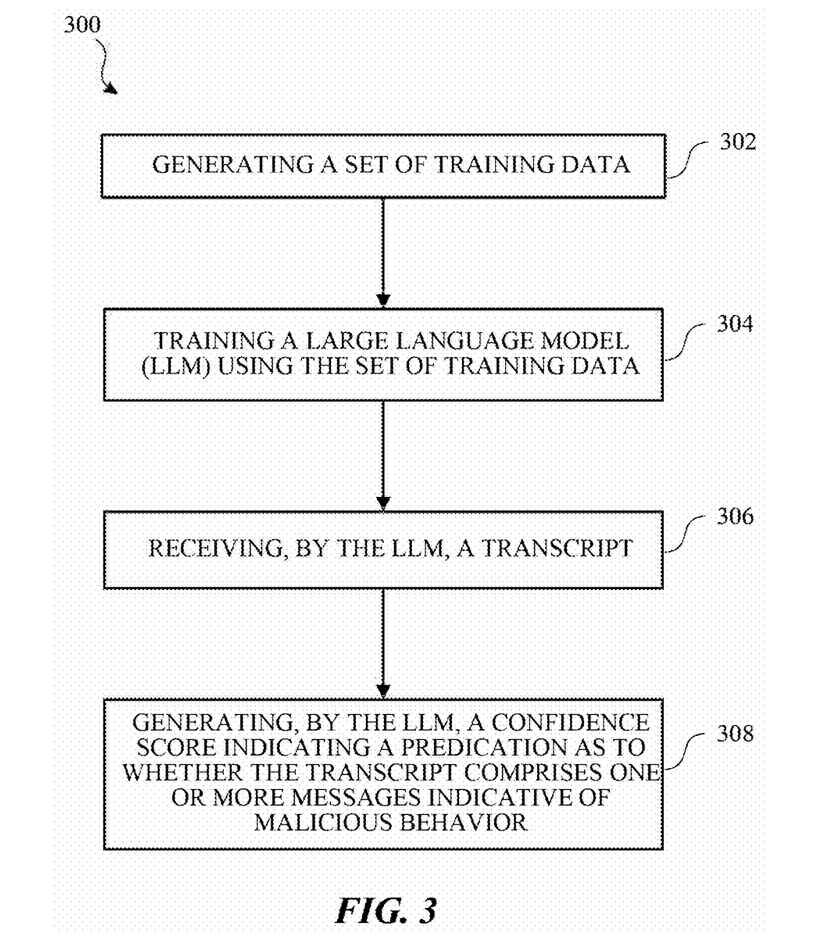
FIG. 3 illustrates a flow diagram of a process performed by a classifier, in accordance with one or more embodiments of the subject technology.

FIG. 3 illustrates a flow diagram of a process 300 performed by a classifier, in accordance with one or more embodiments of the subject technology. For explanatory purposes, the process 300 is primarily described herein with reference to FIG. 1. However, the process 300 is not limited to the items shown in FIG. 1, and one or more blocks (or operations) of the process 300 may be performed by one or more other components of other suitable devices. Further, for explanatory purposes, the blocks of the process 300 are described herein as occurring in serial or linearly. However, multiple blocks of the process 300 may occur in parallel. In addition, the blocks of the process 300 need not be performed in the order shown and/or one or more blocks of the process 300 need not be performed and/or may be replaced by other operations.

In the process 300, at block 302, a set of training data may be generated (e.g., by a computing device 106 and/or a server 108). Generating training data may include accessing, receiving, querying, or any other form of acquiring data locally and/or remotely. Training data may include one or more data points. A data point may include a transcript having a plurality of messages from previous conversations between customer service agents and purported customers. The data point may also include a label indicating whether one or more messages of the transcript are associated with malicious behavior. Malicious behavior may include account takeover, gift card deceit (e.g., fraud), and unknown package deceit (e.g., fraud), concession abuse, among other attack vectors that may allow an unauthorized actor to obtain funds, goods, services, and the like.

At block 304, an LLM may be trained using the set of training data. For example, the LLM may be trained to receive a transcript that includes one or more messages and output a prediction that the transcript includes one or more messages associated with malicious behavior. Training may include supervised learning, fine-tuning, or any other form of configuring a model.

At block 306, the LLM may receive a transcript as input. The transcript may include a plurality of messages exchanged between a customer service agent and a purported customer. In one or more implementations, the transcript may be preprocessed before being received by the LLM such that the transcript is in a format suitable for the LLM. For example, text in the messages may be converted into a set of word embeddings. In one or more implementations, the transcript may be derived from voice data of the conversation between the customer service agent and the purported customer, where the voice data is converted to text data.

At block 308, the LLM may generate a confidence score indicating a prediction as to whether the transcript comprises one or more messages indicative of malicious behavior. In one or more implementations, the confidence score may range from 0 to 1, where higher values indicate a strong likelihood of malicious behavior or vice versa.

In one or more implementations, a threshold confidence score may be determined to which the confidence score may be compared. If the confidence score meets or exceeds the threshold confidence score, a response action may be output by the system. The response action may be automatically or manually generated and may include providing a warning message to the customer service agent indicating that malicious behavior has been detected, issuing a suspension (e.g., temporary or permanent) of the purported customer, flagging the IP address associated with the purported user to prioritize for future malicious behavior monitoring, issuing a legal takedown notice, and/or other malicious behavior mitigation.

In one or more implementations, the transcript may be used to generate another data point for the training data set. The transcript may be automatically or manually analyzed to determine whether there in fact was malicious behavior and the transcript labeled accordingly. Accordingly, the parameters of the LLM may be updated based, at least in part, on the updated training data set.

In one or more implementations, transcripts may be labeled as malicious or non-malicious in an order according to their respective confidence score. For example, a set of transcripts may be queued for a system to determine a label for each transcript. One or more transcripts in the queue may be prioritized over the other transcripts if their confidence score is higher than the other transcripts. Accordingly, higher confidence scores may indicate a higher level of priority to be included in a set of training data for the LLM.

Figure 4:
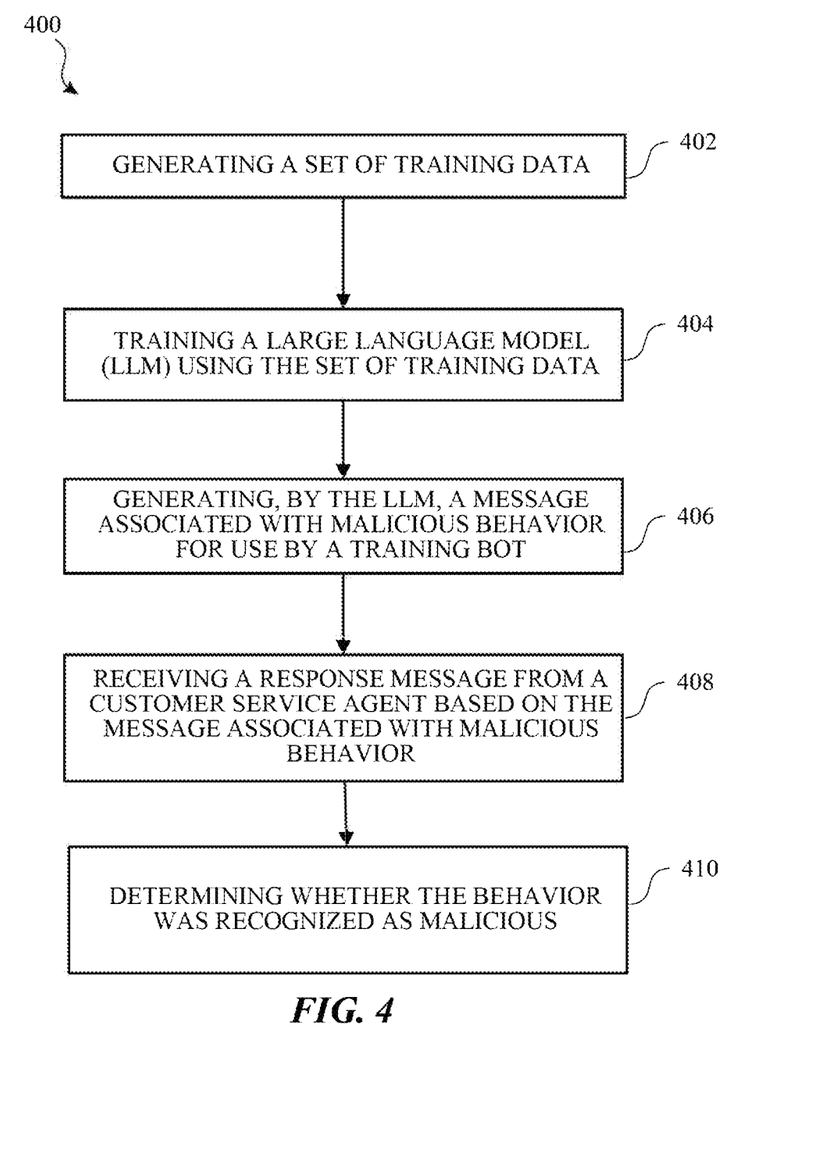
FIG. 4 illustrates a flow diagram of a process performed by a chatbot, in accordance with one or more embodiments of the subject technology.

FIG. 4 illustrates a flow diagram of a process performed by a chatbot, in accordance with one or more embodiments of the subject technology. For explanatory purposes, the process 400 is primarily described herein with reference to FIG. 2. However, the process 400 is not limited to the items shown in FIG. 2, and one or more blocks (or operations) of the process 400 may be performed by one or more other components of other suitable devices. Further, for explanatory purposes, the blocks of the process 400 are described herein as occurring in serial or linearly. However, multiple blocks of the process 400 may occur in parallel. In addition, the blocks of the process 400 need not be performed in the order shown and/or one or more blocks of the process 400 need not be performed and/or may be replaced by other operations.

In the process 400, at block 402, a set of training data may be generated by the server (e.g., server 202). Generating training data may include accessing, receiving, querying, or any other form of acquiring data locally and/or remotely. Training data may include one or more data points. A data point may include a transcript having a plurality of messages from previous conversations between customer service agents and purported customers. The data point may also include a label indicating whether one or more messages of the transcript are associated with malicious behavior. Malicious behavior may include account takeover, gift card deceit (e.g., fraud), and unknown package deceit (e.g., fraud), concession abuse, among other attack vectors that may allow an unauthorized actor to obtain funds, goods, services, and the like.

At block 404, an LLM may be trained using the set of training data. For example, the LLM may be trained to receive one or more messages from a customer service agent and output one or more messages that may be associated with malicious behavior, which may be sent to the customer service agent. Training may include supervised learning, fine-tuning, or any other form of configuration a model.

At block 406, the LLM may generate one or more messages associated with malicious behavior. The message may be sent by the training bot of the server to the customer service agent (e.g., at computing device 206) and may appear to the customer service agent as being sent from a purported user.

In one or more implementations, the training bot may first receive an initial message from the customer service agent before generating the one or more messages to the customer service agent. For example, once the purported user (e.g., the chatbot) is connected to a customer service agent, the customer service agent may initiate the conversation as shown in FIG. 2, where the customer service agent begins the conversation with "Hi there. How can I help you?".

At block 408, the server may receive one or more messages from the customer service agent responding to the message generated by the LLM (a "response message"). The message(s) from the customer service agent may be a continuation of the conversation with the chatbot. For example, the chatbot may state a problem, and the customer service agent may respond with a question regarding the problem. A message from the customer service agent may include an authorization, where an authorization may include any message or action that helps the user carry out malicious behavior and represents the chatbot successfully deceiving the customer service agent. For example, the chatbot may request assistance registering a device to an account, and the customer service agent may improperly register the device. As another example, the chatbot may attempt to deceive the customer service agent into issuing funds to an account, and the customer service agent may improperly issue the funds.

At block 410, if a response message is an authorization, the server may generate (e.g., access, retrieve, determine, and the like) feedback for the customer service agent. For example, the feedback may include an indication of the message(s) from the chatbot associated with malicious behavior and/or prescribed training for the customer service agent. If the customer service agent properly handles the malicious behavior of the chatbot (e.g., no response messages include an authorization), the service may be sent the customer service agent feedback indicating the malicious behavior was properly handled.

In one or more implementations, the type of feedback generated and sent by the server may be based on a number of responses before the response was an action (e.g., granting authorization or mitigating malicious behavior). For example, the feedback may be a grade of how the malicious behavior was handled, and the grade may be higher if the malicious behavior was handled sooner in the conversation.

In one or more implementations, one or more messages of the conversation may be used to generate another data point for the training data set. For example, a message in the transcript that tends to deceive customer service agents may be added as a data point in the training data set. Accordingly, the parameters of the LLM may be updated based, at least in part, on the updated training data set.

Figure 5:
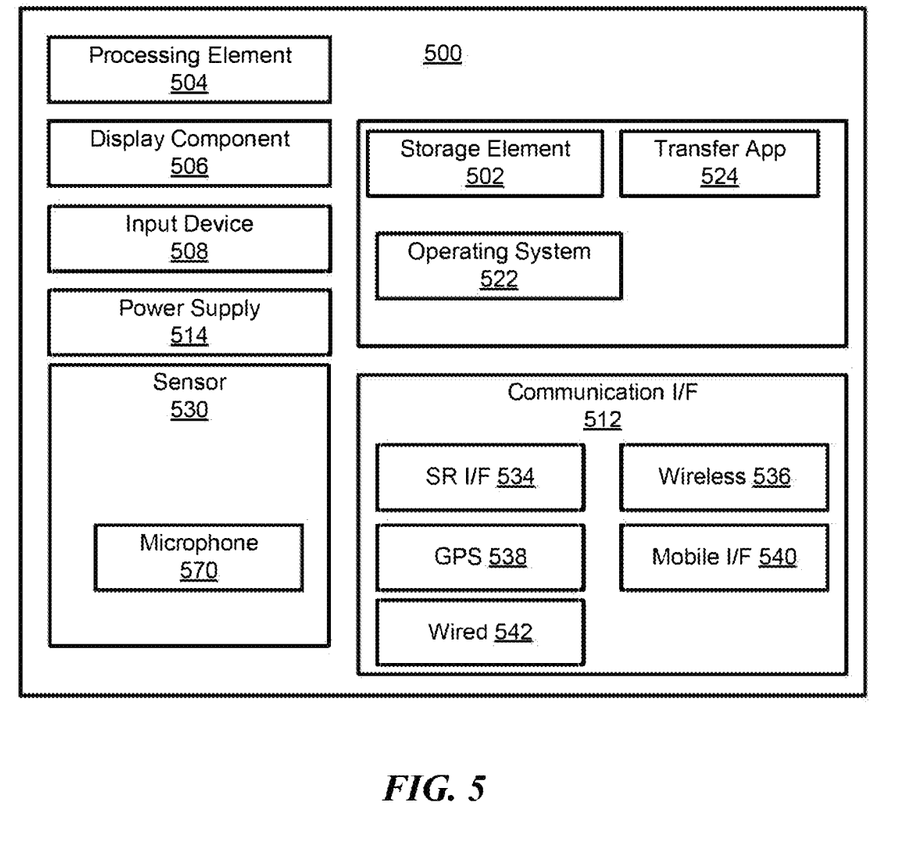
FIG. 5 illustrates a block diagram of an example architecture of a computing device, in accordance with one or more embodiments of the subject technology.

FIG. 5 illustrates a block diagram of an example architecture 500 of a computing device, in accordance with one or more embodiments of the subject technology. The computing device may be configured to detect and/or emulate malicious activity, in accordance with various aspects of the present disclosure. It is understood that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learning models, parameters thereof, and/or hierarchical data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches or other approaches, such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short-range interface 534 may be configured to communicate using one or more short-range wireless protocols such as, for example, NFC, Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
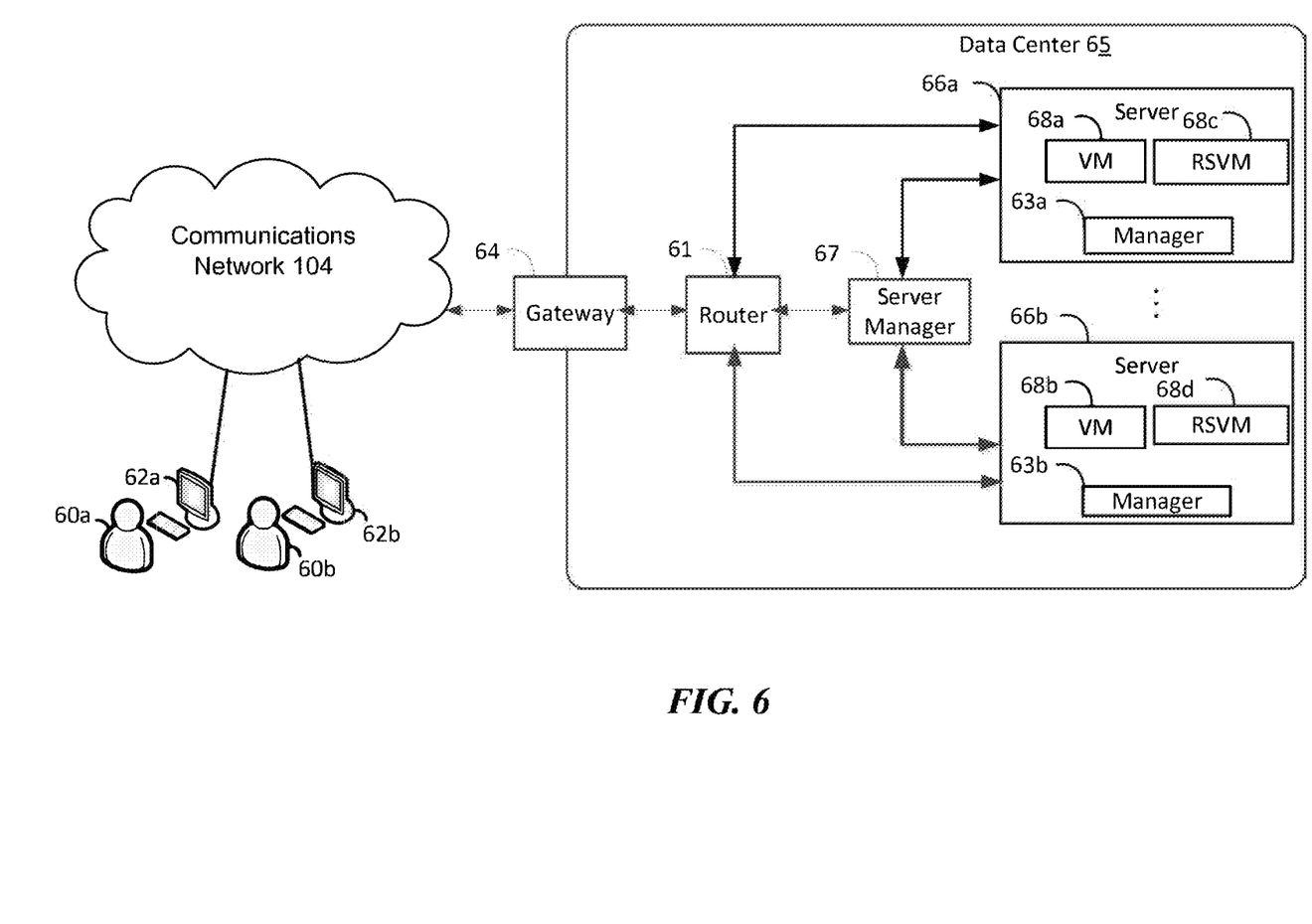
FIG. 6 illustrates a block diagram of an example system for sending and providing data, in accordance with one or more embodiments of the subject technology.

FIG. 6 illustrates a block diagram of an example system for sending and providing data, in accordance with one or more embodiments of the subject technology. The system may be an example computing environment in which embodiments described herein may be implemented. For example, the computing environment of FIG. 6 may be configured to utilize LLMs to detect and/or emulate malicious activity as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60 a and 60 b (which may be referred herein singularly as user 60 or in the plural as users 60) via user computers 62 a and 62 b (which may be referred herein singularly as user computer 62 or in the plural as user computers 62) via network 104. Data center 65 may be configured to provide computing resources for executing applications on a permanent or as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various adversarial network detection described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66 a and 66 b (which may be referred herein singularly as server 66 or in the plural as servers 66) that provide computing resources. These resources may be available as bare metal resources or as virtual machine instances 68 a-d (which may be referred herein singularly as virtual machine instance 68 or in the plural as virtual machine instances 68). In at least some examples, server manager 67 may control operation of and/or maintain servers 66. Virtual machine instances 68 c and 68 d are rendition switching virtual machine ("RSVM") instances. The RSVM virtual machine instances 68 c and 68 d may be configured to perform all, or any portion, of the techniques for improved rendition switching and/or any other of the disclosed techniques in accordance with the present disclosure and described in detail above. As should be understood, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62 *a* or 62 *b* may be a server, a desktop or laptop personal computer, a tablet computer, a wireless telephone, a personal digital assistant (PDA), an e-book reader, a game console, a set-top box, or any other computing device capable of accessing data center 65. User computer 62 *a* or 62 *b* may connect directly to the Internet (e.g., via a cable modem or a Digital Subscriber Line (DSL)). Although only two user computers 62 *a* and 62 *b* are depicted, it should be understood that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63 *a* or 63 *b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be understood that, although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66 *a* and 66 *b*. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be understood that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66 *a* and 66 *b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be understood that the network topology illustrated in FIG. 6 has been greatly simplified and that many more networks and networking devices may be utilized to interconnect the various computing systems disclosed herein. These network topologies and devices should be apparent to those skilled in the art.

It should also be understood that data center 65 described in FIG. 6 is merely illustrative and that other implementations might be utilized. It should also be understood that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set-top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may, in some embodiments, be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media, such as magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical disks. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method, comprising:
generating a set of training data, wherein a first training instance of the set of training data comprises a first plurality of messages between a first customer service agent and a first purported customer and a first label indicating whether one or more messages of the first plurality of messages are associated with malicious behavior;

training a large language model (LLM) using the set of training data to generate messages;
generating, by the LLM representing a second purported customer, a message associated with malicious behavior;
receiving a response message from a second customer service agent based on the message associated with malicious behavior; and
in response to the response message being an authorization, generating a feedback for the second customer service agent based on a number of responses before the response was an action.

2. The method of claim 1, further comprising:
receiving an initial message from the second customer service agent, wherein the generating of the message by the LLM is in response to receiving the initial message from the second customer service agent.

3. The method of claim 1, further comprising
outputting the feedback to the second customer service agent.

4. The method of claim 3, wherein the feedback comprises an indication that the message from the second purported customer is associated with malicious behavior.

5. The method of claim 1, further comprising:
in response to the response message being an authorization, generating a second training instance of the set of training data comprises a second plurality of messages between the second customer service agent and the second purported customer and a second label indicating whether one or more messages of the second plurality of messages are associated with malicious behavior.

6. The method of claim 5, further comprising:
updating parameters of the LLM based at least in part on the second training instance.

7. The method of claim 1, wherein malicious behavior comprises one or more of account takeover, gift card deceit, unknown package deceit, and concession abuse.

8. The method of claim 1, wherein the training comprises:
fine-tuning tuning the LLM using the set of training data.

9. A method, comprising:
generating a set of training data, wherein a first training instance of the set of training data comprises a first plurality of messages exchanged between a first customer service agent and a first purported customer and a first label indicating whether one or more messages of the first plurality of messages are associated with malicious behavior;
training a large language model (LLM) using the set of training data to generate predictions;
receiving, by the LLM, a transcript, wherein the transcript comprises a second plurality of messages exchanged between a second customer service agent and a second purported customer; and
generating, by the LLM, a confidence score indicating a prediction as to whether the transcript comprises one or more messages indicative of malicious behavior.

10. The method of claim 9, further comprising:
determining a threshold confidence score;
comparing the confidence score to the threshold confidence score; and
outputting a response action based on the comparison.

11. The method of claim 10, wherein the outputting step comprises:
in response to the confidence score being at or above the threshold confidence score, generating a second training instance of the set of training data comprising the second plurality of messages of the transcript exchanged between the second customer service agent and the second purported customer and a second label indicating that one or more messages of the second plurality of messages is associated with malicious behavior.

12. The method of claim 11, further comprising:
comparing the confidence score associated with the transcript to a second confidence score associated with a second transcript; and
in response to the confidence score being at or above the second confidence score, determining the second label associated with the transcript before a third label associated with the second transcript.

13. The method of claim 12, further comprising:
updating parameters of the LLM based at least in part on the second training instance.

14. The method of claim 10, wherein the response action comprises providing one or more of a warning message to the second customer service agent, a flag of an IP address associated with the second purported customer, or a suspension of the second purported customer.

15. The method of claim 9, wherein malicious behavior comprises one or more of account takeover, gift card deceit, unknown package deceit, and concession abuse.

16. The method of claim 9, wherein the receiving the transcript comprises:
receiving a voice data; and
converting the voice data to the second plurality of messages to text data.

17. The method of claim 9, wherein the training comprises:
fine-tuning tuning the LLM using the set of training data.

18. A system, comprising:
a controller configured to perform operations comprising:
generating a set of training data, wherein a first training instance of the set of training data comprises a first plurality of messages between a first customer service agent and a first purported customer and a first label indicating whether one or more messages of the first plurality of messages are associated with malicious behavior;
training a large language model (LLM) using the set of training data;
receiving an initial message from a second customer service agent;
in response to receiving the initial message from the second customer service agent, generating, by the LLM representing a second purported customer, a message associated with malicious behavior;
receiving a response message from the second customer service agent based on the message associated with malicious behavior; and
in response to the response message being an authorization, generating a feedback for the second customer service agent based on a number of responses before the response was an action.

19. The system of claim 18, wherein the operations are further comprising outputting the feedback to the second customer service agent.

20. The system of claim 18, wherein the operations are further comprising:
in response to the response message being an authorization, generating a second training instance of the set of training data comprises a second plurality of messages between the second customer service agent and the second purported customer and a second label indicating whether one or more messages of the second plurality of messages are associated with malicious behavior.

\* \* \* \* \*